United States Patent
Eo et al.

(10) Patent No.: US 10,906,230 B2
(45) Date of Patent: Feb. 2, 2021

(54) THERMOFORMING METHOD AND THERMOFORMING APPARATUS

(71) Applicant: Samsung Display Co., Ltd., Yongin-si (KR)

(72) Inventors: Sungwoo Eo, Suwon-si (KR); Hunkyo Kim, Cheonan-si (KR); Byoungyul Shim, Asan-si (KR); Jusuk Oh, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/560,744

(22) Filed: Sep. 4, 2019

(65) Prior Publication Data

US 2019/0389120 A1    Dec. 26, 2019

Related U.S. Application Data

(62) Division of application No. 15/221,546, filed on Jul. 27, 2016, now Pat. No. 10,434,700.

(30) Foreign Application Priority Data

Oct. 8, 2015    (KR) .......................... 10-2015-0141691

(51) Int. Cl.
*B29C 51/08*    (2006.01)
*B29C 51/42*    (2006.01)
(Continued)

(52) U.S. Cl.
CPC .............. *B29C 51/08* (2013.01); *B29C 51/20* (2013.01); *B29C 51/42* (2013.01); *B29C 51/445* (2013.01);
(Continued)

(58) Field of Classification Search
CPC ......... B29C 51/08; B29C 53/04; B29C 51/42; B29C 51/445; B29C 51/20; B29C 51/46;
(Continued)

(56) References Cited

U.S. PATENT DOCUMENTS 2,317,904 A * 4/1943 Galey ................. C03B 23/0256
65/287
2,370,827 A * 3/1945 Weichbrodt ............ B29C 53/04
425/394
(Continued)

FOREIGN PATENT DOCUMENTS

KR    10-2008-0071651    8/2008
KR    10-2011-0096455    8/2011
(Continued)

*Primary Examiner* — Jeffrey M Wollschlager
(74) *Attorney, Agent, or Firm* — Lewis Roca Rothgerber Christie LLP

(57) ABSTRACT

Provided is a method of thermoforming a molding material to have a bent portion and a flat portion extending from the bent portion. The method includes: placing the molding material on a bending mold, the bending mold having a curved surface; and forming the bent portion of the molding material by heating a portion of the molding material at least to a fluidization temperature such that the portion of the molding material bends due to the weight of the flat portion of the molding material to form the bent portion according to a shape of the bending mold.

5 Claims, 11 Drawing Sheets

(51) Int. Cl.
*B29C 51/44* (2006.01)
*B29C 51/20* (2006.01)
*B29C 51/46* (2006.01)
*B29C 53/04* (2006.01)
*B29K 69/00* (2006.01)
*C03B 23/025* (2006.01)
*B29C 33/16* (2006.01)
*B29C 33/32* (2006.01)
*C03B 23/00* (2006.01)

(52) U.S. Cl.
CPC ............. *B29C 51/46* (2013.01); *B29C 53/04* (2013.01); *B29C 33/16* (2013.01); *B29C 33/32* (2013.01); *B29K 2069/00* (2013.01); *C03B 23/0026* (2013.01); *C03B 23/025* (2013.01); *C03B 23/0252* (2013.01); *C03B 23/0256* (2013.01); *C03B 23/0258* (2013.01)

(58) Field of Classification Search
CPC ..... B29C 33/16; B29C 33/32; C03B 23/0252; C03B 23/025; C03B 23/0256; C03B 23/0258; C03B 23/0026; B29K 2069/00
See application file for complete search history.

(56) References Cited

U.S. PATENT DOCUMENTS

| | | | |
|---|---|---|---|
| 2,827,739 A * | 3/1958 | Atkeson | B29C 53/04 65/24 |
| 3,686,051 A * | 8/1972 | Samuel | B29C 51/34 156/212 |
| 4,119,424 A | 10/1978 | Comperatore | |
| 4,184,864 A | 1/1980 | Reese | |
| 4,256,690 A * | 3/1981 | Sabba | B29C 51/32 264/504 |
| 4,508,381 A | 4/1985 | Herring | |
| 5,084,226 A | 1/1992 | Tarlton et al. | |
| 5,292,355 A | 3/1994 | Nikander | |
| 5,648,109 A | 7/1997 | Gutowski et al. | |
| 6,257,022 B1 * | 7/2001 | Caplan | C03B 23/0252 29/525.01 |
| 6,565,532 B1 | 5/2003 | Yuzhakov et al. | |
| 6,808,665 B1 | 10/2004 | Percival | |
| 6,814,916 B2 | 11/2004 | Willden et al. | |
| 9,844,905 B2 | 12/2017 | Polk, Jr. | |
| 9,993,978 B2 | 6/2018 | Downs et al. | |
| 10,016,949 B2 | 7/2018 | Pridie | |
| 2002/0020192 A1 * | 2/2002 | Bader | C03B 23/0258 65/33.1 |
| 2003/0154746 A1 | 8/2003 | Lammi et al. | |
| 2004/0026826 A1 * | 2/2004 | Bergsma | F24F 13/0245 264/285 |
| 2007/0023962 A1 | 2/2007 | Jelic et al. | |
| 2007/0258156 A1 | 11/2007 | Wang et al. | |
| 2008/0099935 A1 | 5/2008 | Egle et al. | |
| 2012/0131730 A1 | 5/2012 | Shoham et al. | |
| 2013/0020743 A1 | 1/2013 | Rapaport et al. | |
| 2013/0125592 A1 * | 5/2013 | Bisson | C03B 23/0258 65/273 |
| 2013/0298608 A1 * | 11/2013 | Langsdorf | C03B 23/0357 65/103 |
| 2013/0337224 A1 * | 12/2013 | Odani | C03C 3/097 428/130 |
| 2014/0144182 A1 * | 5/2014 | Dannoux | C03B 23/0258 65/103 |
| 2015/0000341 A1 * | 1/2015 | Bisson | C03B 23/0235 65/106 |
| 2015/0145181 A1 * | 5/2015 | Polk, Jr. | B29C 51/08 264/554 |

FOREIGN PATENT DOCUMENTS

| | | |
|---|---|---|
| KR | 10-2014-0010504 | 8/2013 |
| KR | 10-2013-0089130 | 6/2014 |
| KR | 10-1449365 | 10/2014 |
| KR | 10-2015-0001955 | 1/2015 |

\* cited by examiner

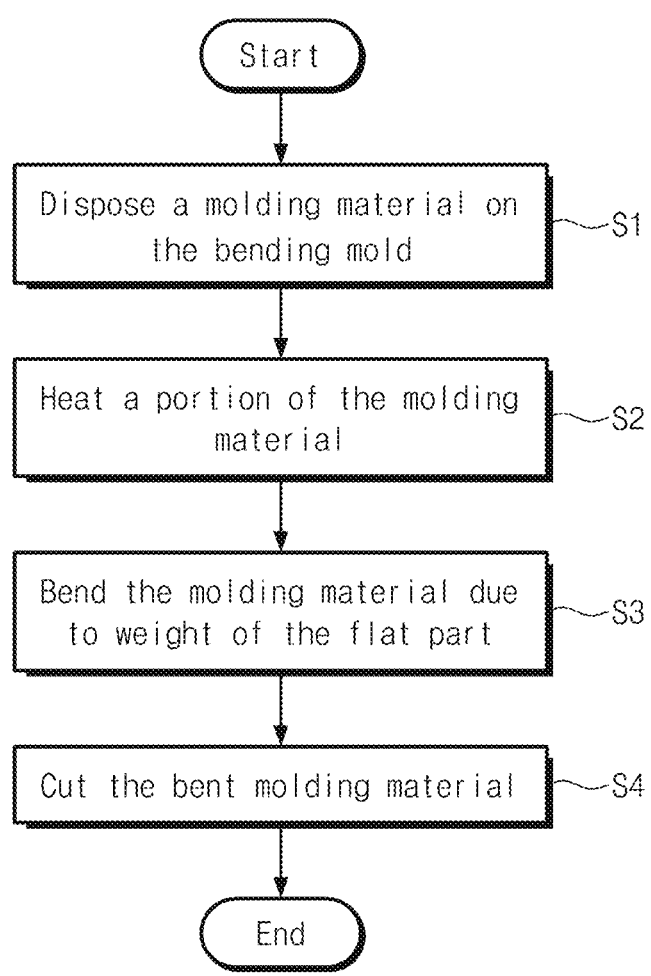

FIG. 3C
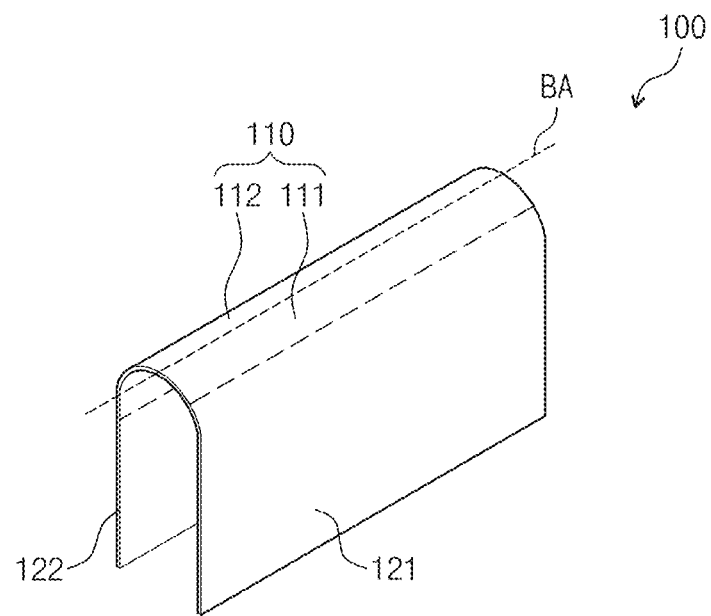
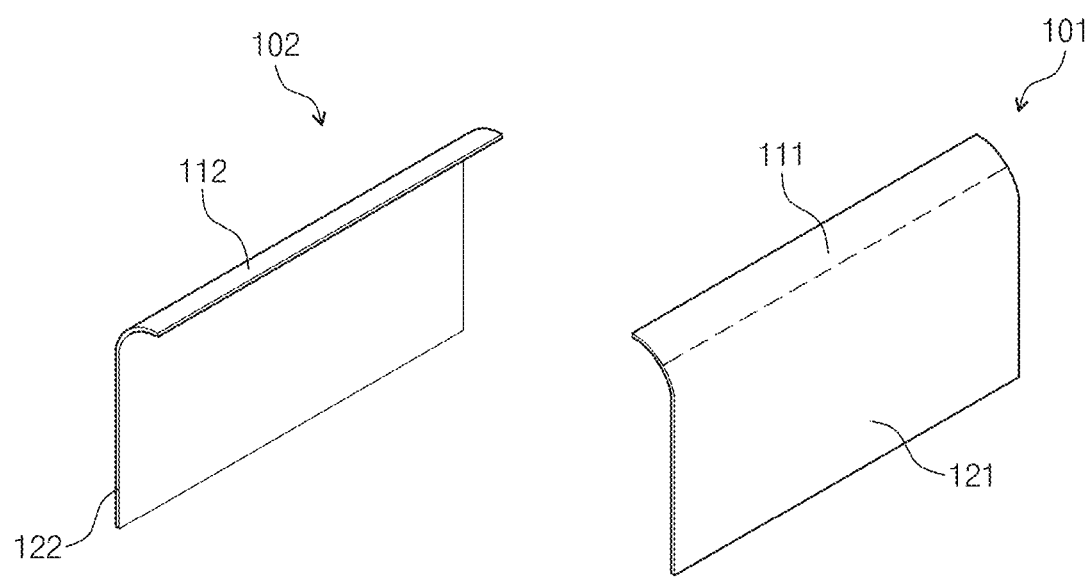

THERMOFORMING METHOD AND THERMOFORMING APPARATUS

CROSS-REFERENCE TO RELATED APPLICATION

This application is a divisional of U.S. patent application Ser. No. 15/221,546, filed Jul. 27, 2016, which claims priority to and the benefit of Korean Patent Application No. 10-2015-0141691, filed on Oct. 8, 2015 in the Korean Intellectual Property Office, the entire content of both of which is hereby incorporated by reference.

BACKGROUND

1. Field

Embodiments of the present disclosure relate to a thermoforming method and a thermoforming apparatus.

2. Description of the Related Art

Thermoforming is a method for manufacturing a molding by deforming a shape of a molding material in a state in which a molding material is heated to be fluidized. Extrusion molding may be applied to a thermoplastic resin (e.g., polyethylene, chloride resin, etc.).

Recently, bended and/or bendable display apparatuses have been developed. These display apparatus include bended and/or bendable display panels and various functional layers.

SUMMARY

Embodiments of the present disclosure provide a thermoforming method and a thermoforming apparatus used to manufacture a molding having a bended or curved shape.

An embodiment of the inventive concept provides a method for thermoforming a molding material to have a bent part and a flat part extending from the bent part. The method includes: placing the molding material on a bending mold, the bending mold having a curved surface; and forming the bent portion of the molding material by heating a portion of the molding material at least to a fluidization temperature such that the portion of the molding material bends to the weight of the flat portion of the molding material to form the bent portion according to a shape of the bending mold.

In an embodiment, a lower surface of the bent portion may be bent according to the curved surface of the bending mold.

In an embodiment, the flat portion may include a first end extending from the bent portion and a second end opposite the first end, and the forming of the bent portion may include the second end rotating with respect to the bending mold due to the weight of the flat portion.

In an embodiment, the forming of the bent portion may further include: arranging a support member under the second end such that and the support member supports the second end; and moving the support member such that the support member does not overlap the second end in a vertical direction and the second end start is permitted to rotate.

In an embodiment, the bending mold may extend in a first direction, and the flat portion may include: a first flat portion extending from the bent part in the first; and a second flat portion extending from the bent portion in a second direction opposite to the first direction.

In an embodiment, the second end rotating may include the second ends of the first and second flat portions rotating clockwise and counterclockwise, respectively.

In an embodiment, the forming of the bent portion may further include coupling a weight to the flat portion.

In an embodiment, the flat portion may include: a first end extending from the bent portion; and a second end opposite to the first end.

In an embodiment, the forming of the bent portion may further include the weight being pulled by a magnetic force of with a magnet arranged along a rotation path of the second end opposite to a center of the bent portion.

In an embodiment, the method for thermoforming may further include cooling the bent portion after the forming of the bent portion.

In an embodiment, the method for thermoforming may further include cutting the molding material along a bending axis of the bent portion to form first and second moldings.

In an embodiment, the bent portion may include first and second bent portions separated by the bending axis. The flat portion may include first and second flat portions respectively extending from the first and second bent portions in different directions. The first molding may include the first bent portion and the first flat portion, and the second molding may include the second bent portion and the second flat portion.

In an embodiment, the first and second moldings may have substantially the same shape.

In an embodiment, the molding material may include a middle flat portion between the first and second bent portions. The first and second bending molds may extend from opposite sides of a flat mold corresponding to the middle flat portion, and the placing of the molding material may include respectively arranging the first and second bent portions on the first and second bending molds.

In an embodiment, each of the first and second bending molds may extend in a first direction. The flat portion may include: a first flat portion extending from the first bent portion in a second direction different from the first direction; and a second flat portion extending from the second bent portion in a third direction opposite to the second direction.

In an embodiment, the heating of the bent portion of the molding material may include heating the bent portion up to at least a fluidization temperature of the bent portion.

In an embodiment of the inventive concept, an apparatus for thermoforming a molding material to have a bent portion and a flat portion extending from the bent portion includes: a base stage; a bending mold on the base stage, and having a curved upper surface; a temperature controller configured to heat the molding material such that the portion is fluidized, wherein the fluidized bent portion is configured to be bent due to the weight of the flat portion.

In an embodiment, the flat portion may have a first end extending from the bent portion and a second end opposite to the first end, and when the bent portion bends, the second end may rotate about the bending mold.

In an embodiment, the apparatus for thermoforming may further include a support member. In a first state, the support member may be under the flat portion in a vertical direction such that the flat portion is supported, and in a second state, the support member does not overlap the second end in the vertical direction such that the flat portion rotating.

In an embodiment, the apparatus for thermoforming may further include a weight coupled to the flat portion.

In an embodiment, the base stage may further include a sliding surface, and when the bent portion bends, the weight may slide along the sliding surface.

In an embodiment, the apparatus for thermoforming may further include a magnet beneath the sliding surface and arranged along a rotation path of the second end. The weight may include a magnetic material, and the magnet is configured to apply a force to the weight in a direction away from a center of the bent portion.

In an embodiment, the temperature controller may be configured to cool the bent portion to the fluidization temperature of the bent portion or lower.

In an embodiment, the bending mold may be spaced from the flat portion along a plane.

BRIEF DESCRIPTION OF THE DRAWINGS

The accompanying drawings are included to provide a further understanding of the inventive concept and are incorporated in and constitute a part of this specification. The drawings illustrate exemplary embodiments of the inventive concept and, together with the description, serve to explain aspects and features of the inventive concept. In the drawings:

FIG. 2 is a flowchart of a thermoforming method according to an embodiment of the inventive concept;

FIG. 3C is an illustration of step S4 of FIG. 2;

DETAILED DESCRIPTION

Figure 1A:
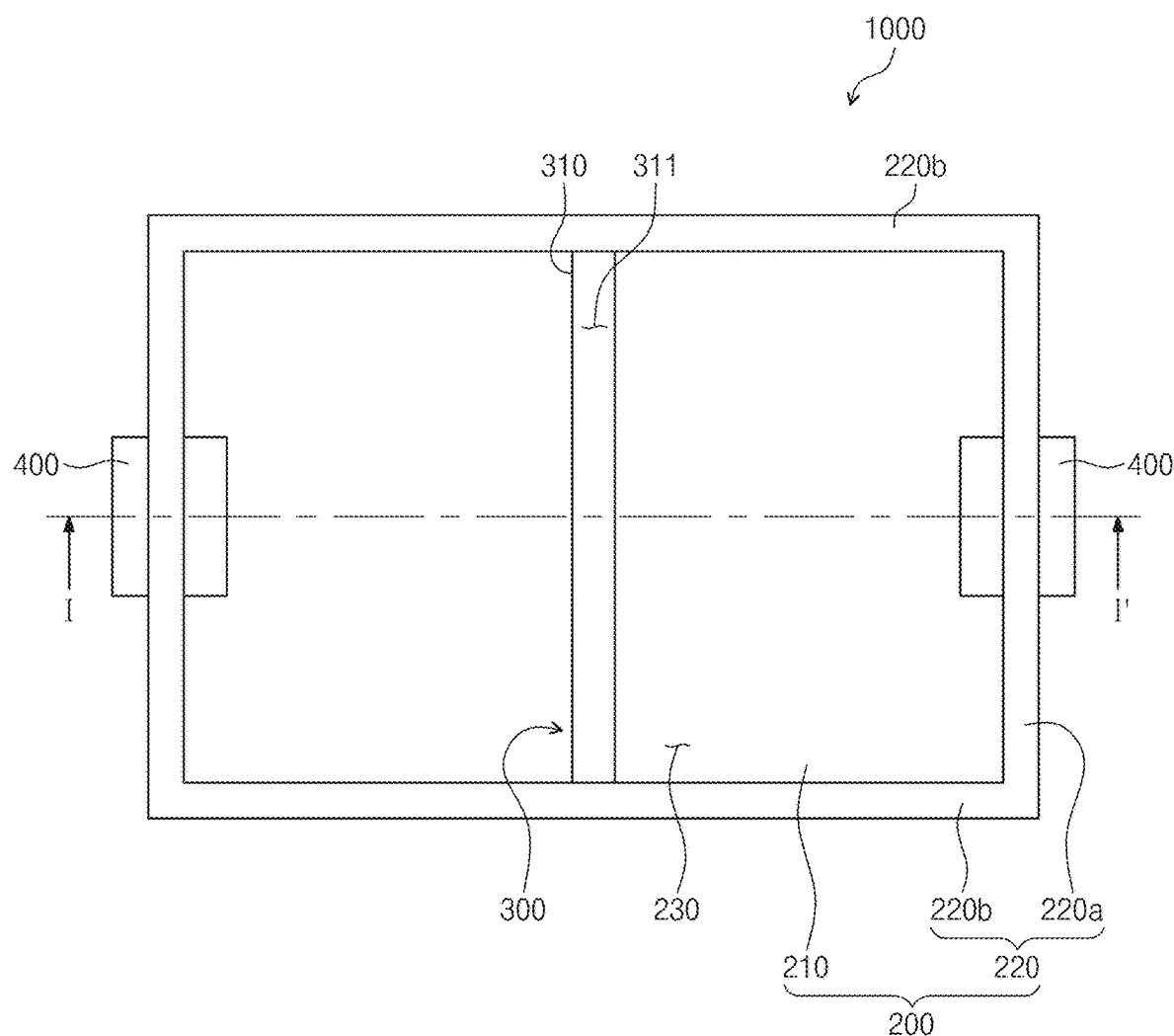
FIG. 1A is a plan view of a thermoforming apparatus according to an embodiment of the inventive concept.

The inventive concept may be modified in several different forms, and only certain embodiments will be exemplified in the drawings and described in detail. It is to be understood that embodiments of the present invention are not limited to the described embodiments, and the present disclosure is intended to cover various modifications and equivalent arrangements included within the spirit and scope of the disclosure, including the appended claims and their equivalents.

In describing the drawings, like reference numerals refer to like elements throughout. In the drawings, the dimensions and sizes of the structures and components may be exaggerated, omitted, or schematically illustrated for convenience of description and clarity. It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. The terms in singular form may include plural forms unless referred to in the contrary. For example, as used herein, the singular forms "a" and "an" are intended to include the plural forms as well, unless the context clearly indicates otherwise.

It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. Furthermore, it will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Hereinafter, exemplary embodiments of the inventive concept will be described in more detail with reference to the accompanying drawings.

Figure 1B:
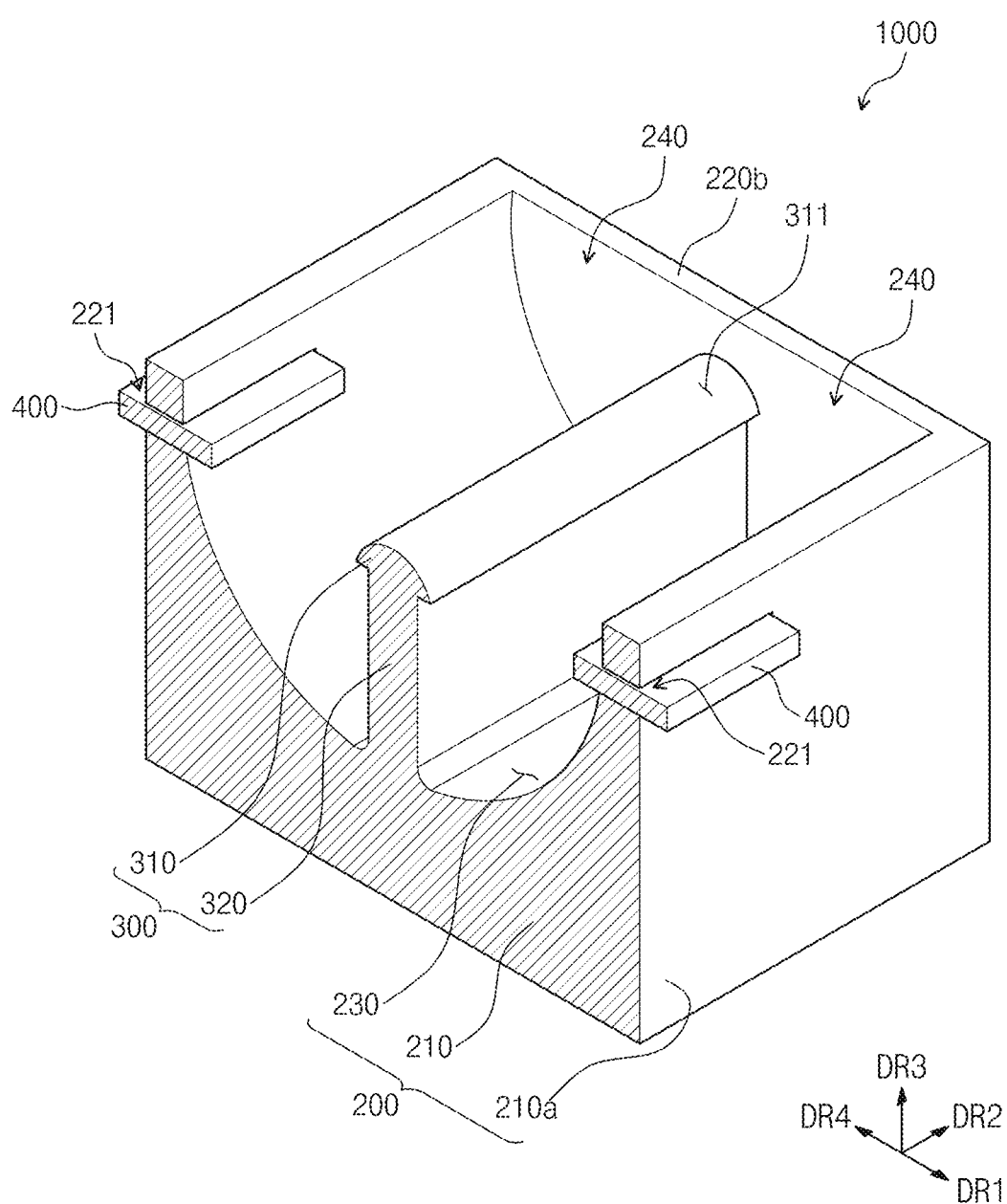
FIG. 1B is a partial cross-sectional perspective view of the thermoforming apparatus taken along the line I-I' of FIG. 1A.

FIG. 1A is a plan view of a thermoforming apparatus according to an embodiment of the inventive concept, and FIG. 1B is a partial cross-sectional perspective view of the thermoforming apparatus taken along the line I-I' of FIG. 1A.

Referring to FIGS. 1A and 1B, a thermoforming apparatus 1000 includes a base stage 200 and a mold part 300 (e.g., a mold).

The base stage 200 may include a bottom part 210 (e.g., a bottom or a bottom portion) and a side part 220 (e.g., a side or a side portion).

In one embodiment of the inventive concept, the bottom part 210, when viewed in a plan view, may have a rectangular shape having a pair of parallel long sides and a pair of parallel short sides. The long sides are, for example, parallel to a first direction DR1, and the short sides are, for example, parallel to a second direction DR2. The first and second directions DR1 and DR2, for example, may cross each other at a right angle. However, the shape of the bottom part 210 is not limited to a rectangle and may be variously changed.

The side part 220 may extend in a vertical direction from the long sides and short sides of the bottom part 210. The vertical direction may be a third direction DR3 perpendicular to the first and second directions DR1 and DR2.

For example, the side part 220 may include a first side part 220*a* (e.g., a first side or a first side portion) extending in the third direction DR3 from the short sides of the bottom part 210 and a second side part 220*b* (e.g., a second side or a second side portion) extending in the third direction DR3 from the long sides of the bottom part 210.

The base stage 200 may further include a sliding surface 230. The sliding surface 230 may have a curved surface extending generally along the second direction DR2 and the third direction DR3. In one embodiment, the sliding surface 230 is downwardly concave. A cross-section of the sliding surface 230 taken along the first and third directions DR1 and DR3 may be approximately a downwardly concave circular arc. A rotation space 240 (e.g., a rotation area or void) may be defined in the base stage 200 by (e.g., above) the sliding surface 230. The sliding surface 230 will be further described later.

In one embodiment of the inventive concept, the mold part 300 extends in the third direction DR3 from the base stage 200. The mold part 300 includes a bending mold 310 (e.g., a bent or curved mold) and a connection part 320 (e.g., a connector). The connection part 320 extends in the third direction DR3 from the base stage 200. A lower end of the connection part 320 may be connected with or may extend from (e.g., may be integral with) the sliding surface 230.

The connection part 320 may have or may be, for example, a wall extending in the second direction DR2, and both side ends of the connection part 320 may extend parallel to (e.g., may extend in) the second direction DR2 to be connected with the second side parts 220*b*. The rotation space 240 may be divided (e.g., may be divided into two parts or areas) along the first direction DR1 by the connection part 320.

In one embodiment of the inventive concept, the bending mold 310 is disposed or arranged on an upper end of the connection part 320. An upper surface 311 of the bending mold 310 is curved. The upper surface 311 may extend in the second direction DR2 and may have an upwardly convex semi-circular shape (e.g., may have an upwardly convex semi-circular shape protruding in the third direction DR3).

In an embodiment of the inventive concept, the thermoforming apparatus 1000 may further include a support part 400 (e.g., a support or a support member). The support part 400 may be, for example, provided as a pair (e.g., two support parts 400 may be provided in the thermoforming apparatus 1000), and the support parts 400 may be respectively coupled to the first side parts 220*a*. For example, the support parts 400 may be coupled to (e.g., inserted into) openings 221 (e.g., holes, slits, or grooves) defined in the first side parts 220*a* such that the support parts 400 are configured to move in the first direction DR1 when inserted into the openings 221. The support part 400 may, for example, have a plate shape extending in the second direction DR2. The support part 400 will be further described later.

Figure 3A:
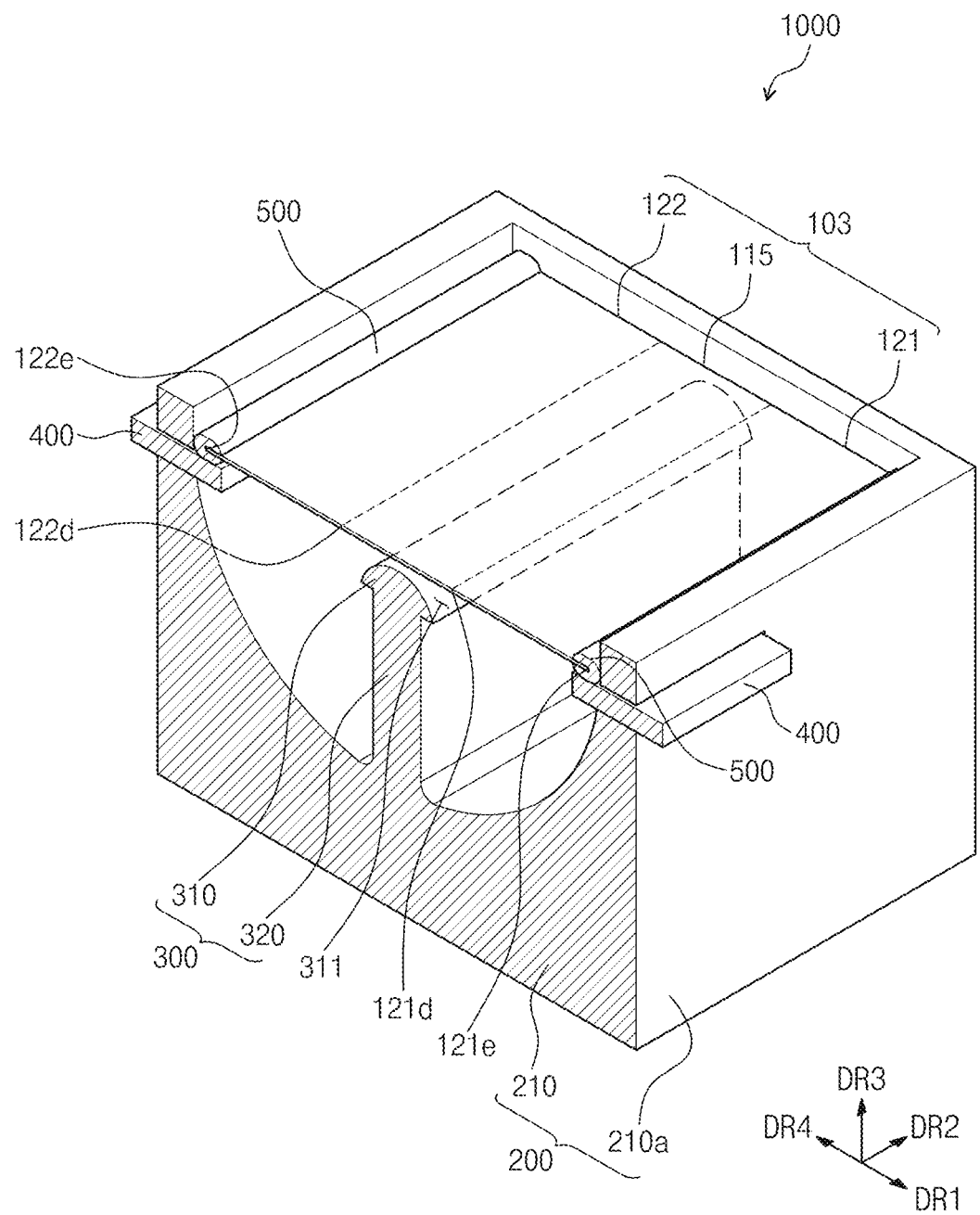
FIG. 3A is an illustration of step S1 of FIG. 2.
Figure 3B:
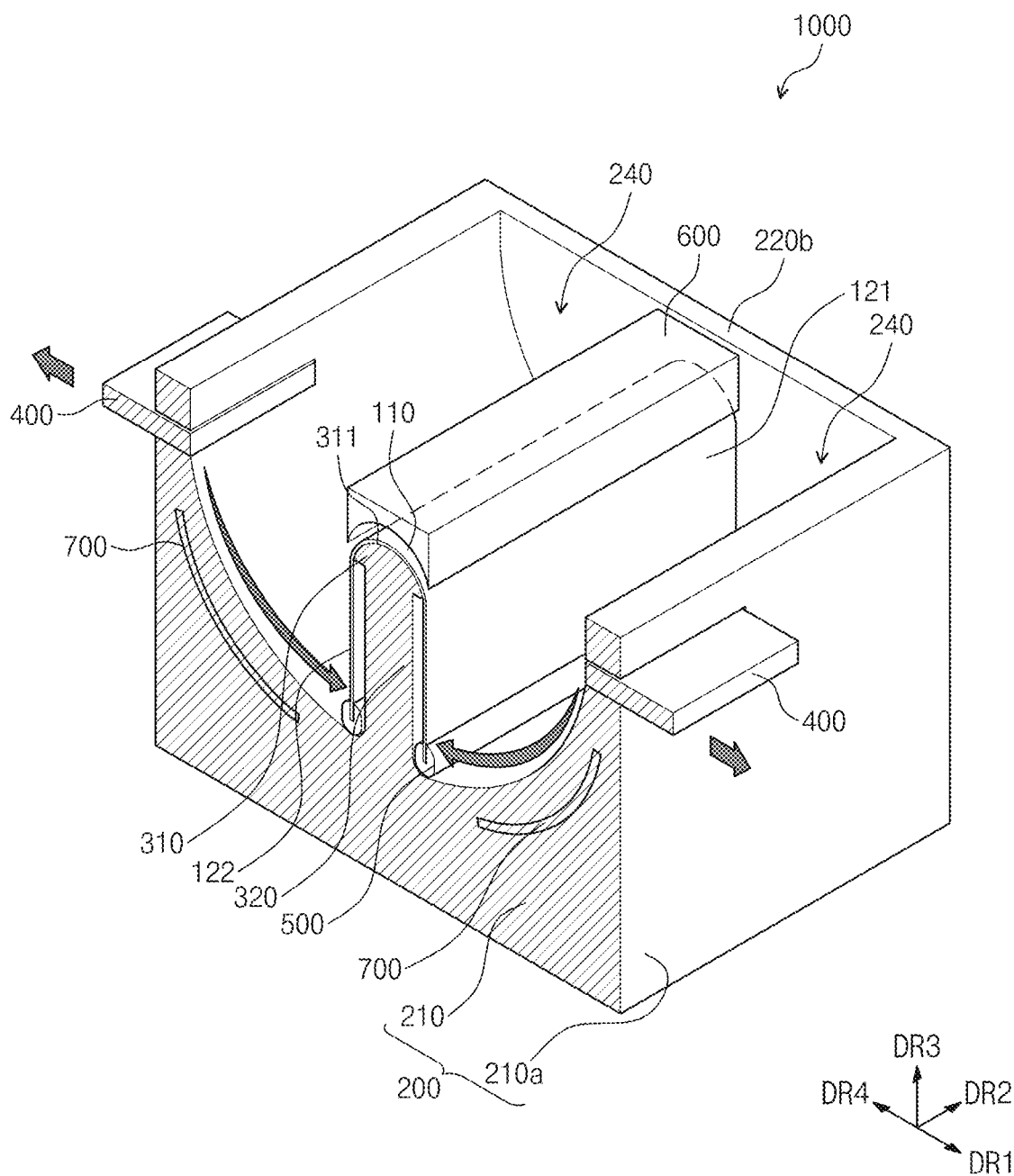
FIG. 3B is an illustration of steps S2 and S3 of FIG. 2.

FIG. 2 is a flowchart of a thermoforming method according to an embodiment of the inventive concept, FIG. 3A is an illustration of step S1 of FIG. 2, FIG. 3B is an illustration of steps S2 and S3 of FIG. 2, and FIG. 3C is an illustration of step S4 of FIG. 2.

Referring to FIGS. 2-3C, a molding material 103 (e.g., a molding blank) is disposed in the thermoforming apparatus 1000.

The molding material 103 may be subdivided into a middle flat part 115 (e.g., a flat portion) to be bent through a thermoforming method performed by using the thermoforming apparatus 1000 and an adjacent flat part (e.g., an adjacent flat portion) that is substantially flat. In one embodiment of the inventive concept, the adjacent flat part may include a first flat part 121 (e.g., first flat portion) extending in the first direction DR1 from an end of the middle flat portion 115 and a second flat part 122 (e.g., a second flat portion) extending in a fourth direction DR4 opposite to the first direction from an opposite end of the middle flat part 115. The molding material 103 may include or may be, for example, glass and/or may also include or may be a thermoplastic resin, such as polycarbonate.

In one embodiment of the inventive concept, the molding material 103 is disposed in the thermoforming apparatus 1000 such that the middle flat portion 115 is disposed on the bending mold 310 (S1). A lower surface of the middle flat portion 115 may directly contact, for example, the upper surface 311 of the bending mold 310.

In one embodiment of the inventive concept, the thermoforming apparatus 1000 may further include a weight 500. The weight 500 may be coupled to both ends of the molding material 103.

For example, the first flat part 121 may have a first end 121*d* and a second end 121*e*. The first end 121*d* of the first flat part 121 is connected to the middle flat portion 115, and the second end 121*e* of the first flat part 121 is opposite to the first end 121*d* in a direction away from the middle flat portion 115 (e.g., in the first direction DR1). The first end 121*d* and the second end 121*e* of the first flat part 121 may extend in the second direction DR2 and face each other. Similarly, the second flat part 122 have a first end 122*d* and a second end 122*e*.

In one embodiment of the inventive concept, the weights 500 are provided in a pair (e.g., two weights 500 are provided), and ones of the weights 500 may be respectively coupled to the second ends 121*e* and 122*e*. Each of the weights 500 may extend, for example, in the second direction DR2. Grooves, into which the second ends 121*e* and 122*e* may be inserted, are defined in the weights 500. Also, a stopper, which prevents the weights 500 from becoming unintentionally separated from the second ends 121*e* and 122*e*, may be provided in the weights 500.

In a first state, the support parts 400 may be disposed such that they protrude towards the mold part 300 from the first side parts 220*a* (e.g., the supports parts 400 may be positioned in the first side parts 220*a* such that they protrude into the rotation spaces 240). The support parts 400 support the second ends 121*e* and 122*e*. Ones of the support parts 400 are respectively disposed under the second ends 121*e* and 122*e*. For example, the ones of the support parts 400 respectively overlap the second ends 121*e* and 122*e* in the third direction DR3.

In one embodiment of the inventive concept, the support parts 400 may support the second ends 121*e* and 122*e* through the weights 500. For example, upper surfaces of the support parts 400 contact lower surfaces of the weights 500 to support the lower surfaces of the weights 500 and, thus, also support the second ends 121*e* and 122*e*.

Referring to FIG. 3B, the thermoforming apparatus 1000 may further include a temperature control unit 600 (e.g., a temperature controller). The temperature control unit 600 may be disposed at or under the middle flat part 115 and may extend in the second direction DR2 along the middle flat part 115. The temperature control unit 600 may heat the middle flat part 115 up to a fluidization temperature or higher such that the middle flat part 115 is fluidized. At the fluidization temperature or higher, the molding material 103 may be fluidized.

In one embodiment of the inventive concept, the temperature control unit 600 may include a heater. The heater may provide heat to (e.g., may heat) the middle flat part 115 by directly contacting the middle flat part 115, through another member that contacts the middle flat part 115 (e.g., the heater may heat the middle flat part 115 via direct conduction or via conduction through an intermediate member), or in a state of being spaced from (e.g., spaced a predetermined distance from) the middle flat part 115. Also, in another embodiment of the inventive concept, the temperature control unit 600 may be provided in the bending mold 310 and may provide heat to the middle flat part 115 through the upper surface 311 of the bending mold 310.

In a second state, the support parts 400 move in a direction away from the mold part 300 (e.g., the support parts 400 move to be outside of the rotation spaces 240). Accordingly, the support parts 400 do not overlap the second ends 121*e* and 122*e* in the third direction DR3 such that the support parts 400 do not support the second ends 121*e* and 122*e*. As the support parts 400 move to the second state, as further described below, the second ends 121*e* and 122*e* may begin to rotate.

As the middle flat part 115 is heated and fluidized, the middle flat part 115 may bend due to the weight of the first and second flat parts 121 and 122 (S3). For example, because the middle flat part 115 is fluidized to increase its flexibility while the first and second flat parts 121 and 122 retain their rigidity, the first and second flat parts 121 and 122 are respectively rotated clockwise and counterclockwise due to the gravitational force applied to the first and second flat parts 121 and 122. Accordingly, the middle flat part 115 is bent or curved to form the bent part 110. As a result, the middle flat part 115 may be bent around the bending mold 310 to form the bent part 110.

For example, the second ends 121*e* and 122*e* may be respectively rotated about the bending mold 310 (or the center of the middle flat part 115/the bent part 110) clockwise and counterclockwise.

The weights 500 may slide along the sliding surface 230. The sliding surface 230 guides the rotation of the second ends 121*e* and 122*e*. Accordingly, the amount of force applied to the middle flat part 115 may be reduced or limited, and the middle flat part 115 may be sufficiently and accurately bent to form the bent part 110.

As the first and second flat parts 121 and 122 rotate, a first force facing toward center of the middle flat part 115 may be applied to the middle flat part 115 from the first and second flat parts 121 and 122. The first force is applied to the middle flat part 115 as a horizontal pressure, and the shape of the middle flat part 115 may change or be distorted due to the first force.

In one embodiment of the inventive concept, the thermoforming apparatus 1000 may further include a magnetic part 700 (e.g., a magnet) which reduces or cancels the first force. The magnetic part 700 may be provided in (e.g., may be encased in) the base stage 200. In one embodiment of the inventive concept, the magnetic part 700 may be disposed along or corresponding to the rotation trajectory or path of the second ends 121*e* and 122*e*. The magnetic part 700 may have, for example, a shape corresponding to the sliding surface 230 and may be disposed adjacent to or under the sliding surface 230. In one embodiment of the inventive concept, the weights 500 may include a magnetic material. Accordingly, a second force, which pulls the weights in a direction away from the center of the middle flat part 115 due to the magnetic force between the weights 500 and the magnetic part 700, is applied to the weights 500. The second force may reduce or cancel the first force. Accordingly, horizontal pressure may not be applied to the middle flat part 115, and the middle flat part 115 may be sufficiently and accurately bent to form the bent part 110.

As the middle flat part 115 bends, the upper surface 311 of the bending mold 310 supports the lower surface of the middle flat part 115. Accordingly, when the first and second flat parts 121 and 122 are fully rotated (e.g., when the rotation of the first and second flat parts 121 and 122 is completed), the bent part 110 may be bent to be upwardly convex corresponding to the upper surface 311 of the bending mold 310. That is, the shape of the bent part 110 may be determined by the bending mold 310.

After the rotation of the first and second flat parts 121 and 122, the temperature control unit 600 cools the bent part 110 down to the fluidization temperature or less. In one embodiment of the inventive concept, the temperature control unit 600 may include a cooler. The cooler may cool the bent part 110 by directly contacting the bent part 110, through another member contacting the bent part 110, or in a state of being spaced from (e.g., spaced a predetermined distance from) the bent part 110.

In one embodiment of the inventive concept, the thermoforming apparatus 1000 may further include a seal cover. The seal cover may be disposed over the side part 220 and may seal the rotation spaces 240 by being coupled to the side part 220. Accordingly, when the temperature control unit 600 heats the molding material 103, the sliding surface 230, and the mold part 300, these components may not be damaged by external water, oxygen, etc.

Then, as illustrated in FIG. 3C, in one embodiment of the inventive concept, the bent part 110, after being removed from the thermoforming apparatus 1000, is cut along a bending axis BA (S4). The bending axis BA may pass through the center of the bent part 110 along the second direction DR2. The bent part 110 may be subdivided into a first bent part 111 and a second bent part 112 (e.g., a first bent portion and a second bent portion, respectively) with respect to the bending axis BA. For example, the border between the first and second bent parts 111 and 112 may be defined by the bending axis BA (e.g., the first and second bent parts 111 and 112 may be separated by the bending axis BA).

First and second moldings 101 and 102 may be formed by cutting the molding material 100 (e.g., by cutting the bent part 110). The first molding 101 may include the first bent part 111 and the first flat part 121, and the second molding 102 may include the second bent part 112 and the second flat part 122. In one embodiment of the inventive concept, the first and second moldings 101 and 102 may have the same or substantially similar shapes.

As described above, the middle flat part 115 is heated to be fluidized and is then bent due to the weight of the adjacent flat part or parts. Accordingly, a molding including the bent part 110 having a relatively large area may be efficiently manufactured. Also, in comparison with other extrusion molding or injection molding forming methods, the molding material 103 may not be damaged because the forming is performed by using less pressure. Furthermore, because a burr, which is often generated at a border between two molds used in the injection molding process, is not generated, an additional grinding process for removing the burr may be omitted. Even further, because the first and second moldings 101 and 102 are formed from one molding material 103 (e.g., from a single molding piece or blank), a process yield may be improved compared to other forming method.

In one embodiment of the inventive concept, the shape (or curvature) of the bent part 110 may be effectively determined by the upper surface 311 of the bending mold 310. Also, the bending speed or rate of the molding material 103 may be controlled or determined, at least in part, by the weights 500. By controlling the bending speed or rate, the thickness of the bent part 110 may be controlled and the molding material 103 may not be damaged during the bending process.

Figure 4:
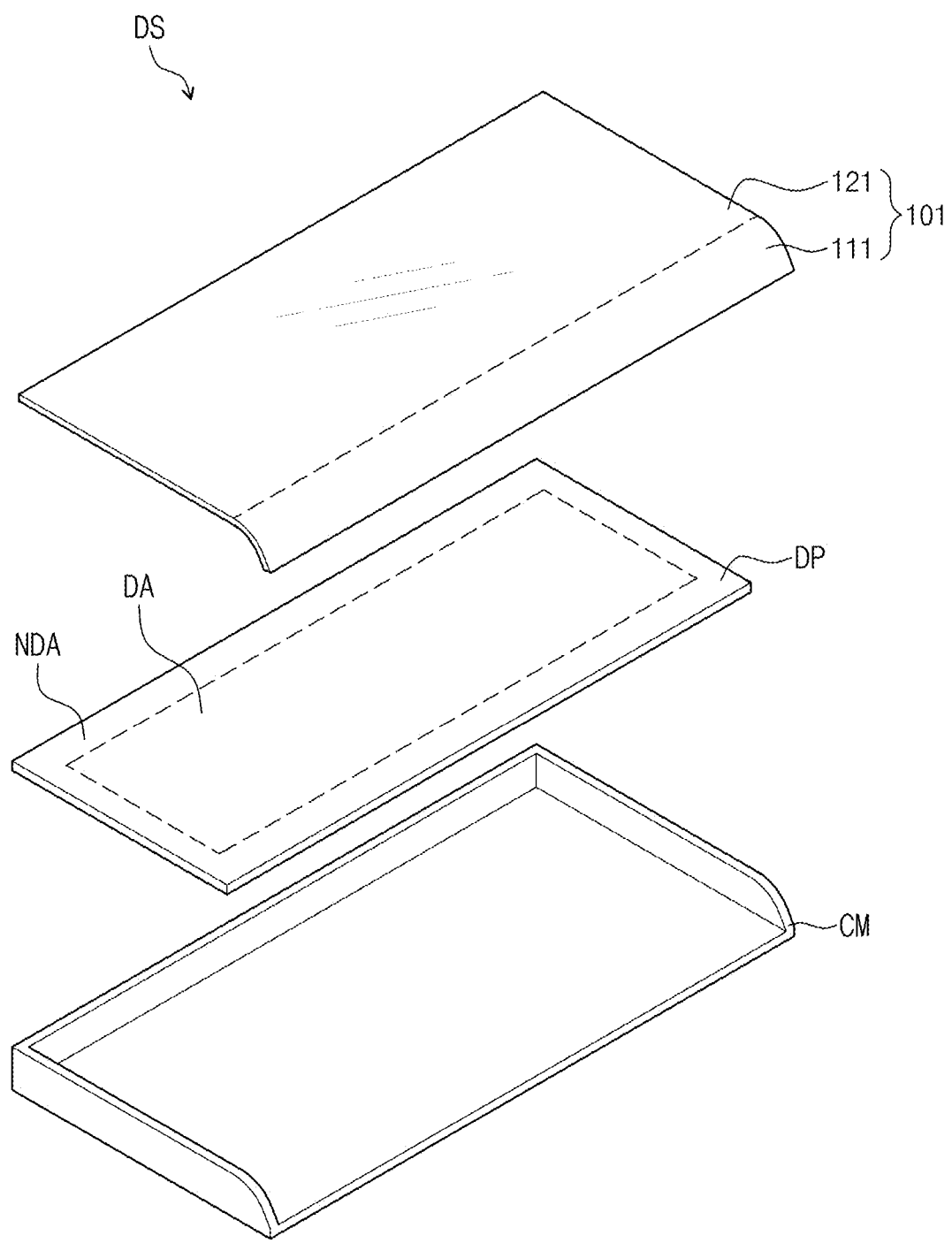
FIG. 4 is an exploded perspective view of a display apparatus to which the molding illustrated in FIG. 3C is applied.

FIG. 4 is an exploded perspective view of a display apparatus to which the molding illustrated in FIG. 3C is applied.

The first molding 101 may be applied to a display apparatus DS as a cover member 101. The display apparatus DS includes a display member DP, the cover member 101, and an accommodation member CM. The display member DP is disposed between the accommodation member CM and the cover member 101.

The display member DP receives power to display an image. The display member DP is subdivided, in a plane, into a display area DA and a peripheral area NDA. The display area DA is generally defined as a center of the display member DP. Images are displayed at the display area DA.

The peripheral area NDA is defined adjacent to the display area DA. The peripheral area NDA may be defined as a frame shape surrounding the display area DA. Images are not displayed at the peripheral area NDA.

The display member DP may include a display panel and a touch panel. The display panel generates an image according to an electrical signal. The display panel is not specifically limited, and, the display panel may be, for example, an organic light emitting display panel, a liquid crystal display panel, a plasma display panel, an electrophoretic display panel, an electrowetting display panel, etc.

The touch panel calculates or determines a coordinate (e.g., a location) of an external input. The external input includes a stylus pen and/or a pressure due to a finger of a user. The external pressure may be substantially generated on the cover member 101.

Also, the touch panel is not specifically limited to any one method or type, and may be, for example, a resistive touch panel, a capacitive touch panel, or the like. Also, in a display apparatus according to an embodiment of the inventive concept, the touch panel may not be included.

The cover member 101 is disposed on the display member DP to cover the display member DP. The cover member 101 may be a window (e.g., a window member) of the display apparatus DS.

The cover member 101 according to one embodiment of the inventive concept may stably protect the display member DP from an external shock applied to the display area DA.

The accommodation member CM is disposed under the display member DP. The accommodation member CM defines an accommodation space. In the accommodation space defined by the accommodation member CM, the display member DP and various components for driving the display apparatus DS may be accommodated together.

The accommodation member CM is coupled to the cover member 101 to define the appearance (e.g., the external appearance) of the display apparatus DS. The accommodation member CM may have various, suitable shapes, including shapes that define the accommodation space and may be coupled to the cover member 101; however, the shape of the accommodation member CM is not limited to any particular shape. The accommodation member CM and the cover member 101 stably protect the components accommodated therein from external shocks.

Figure 5A:
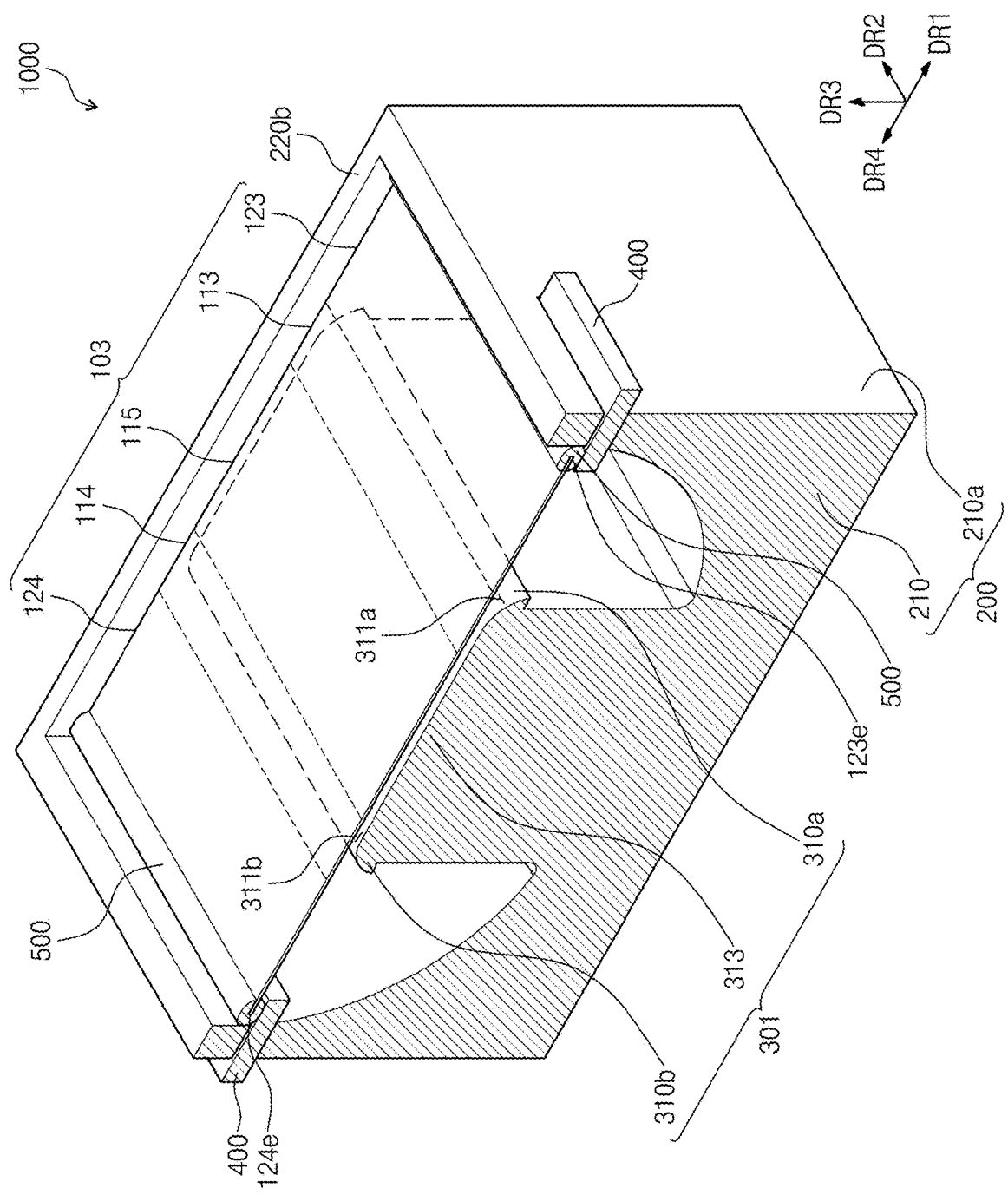
FIGS. 5A-5C are illustrations of a forming process according to an embodiment of the inventive concept.
Figure 5B:
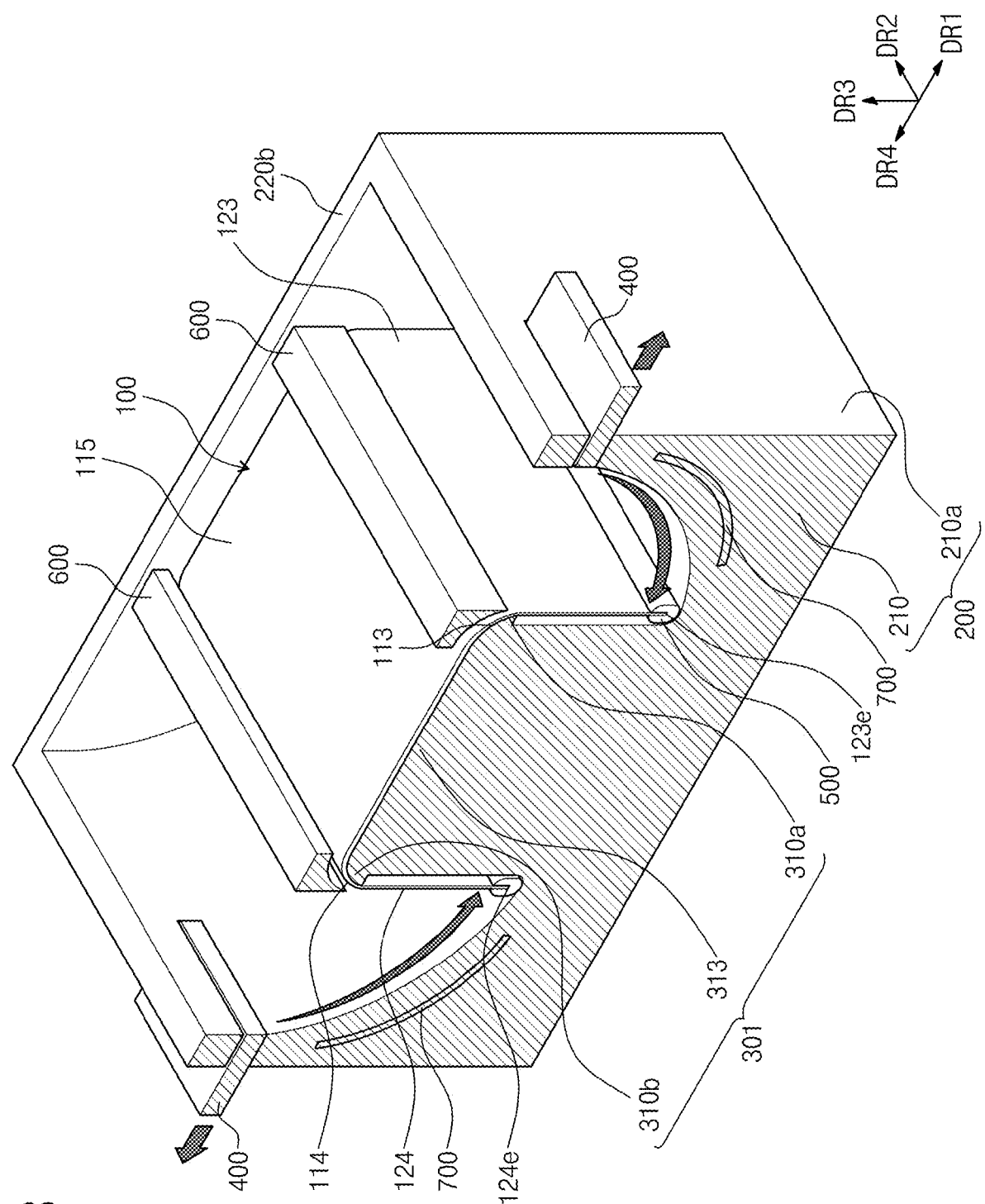
Figure 5C:
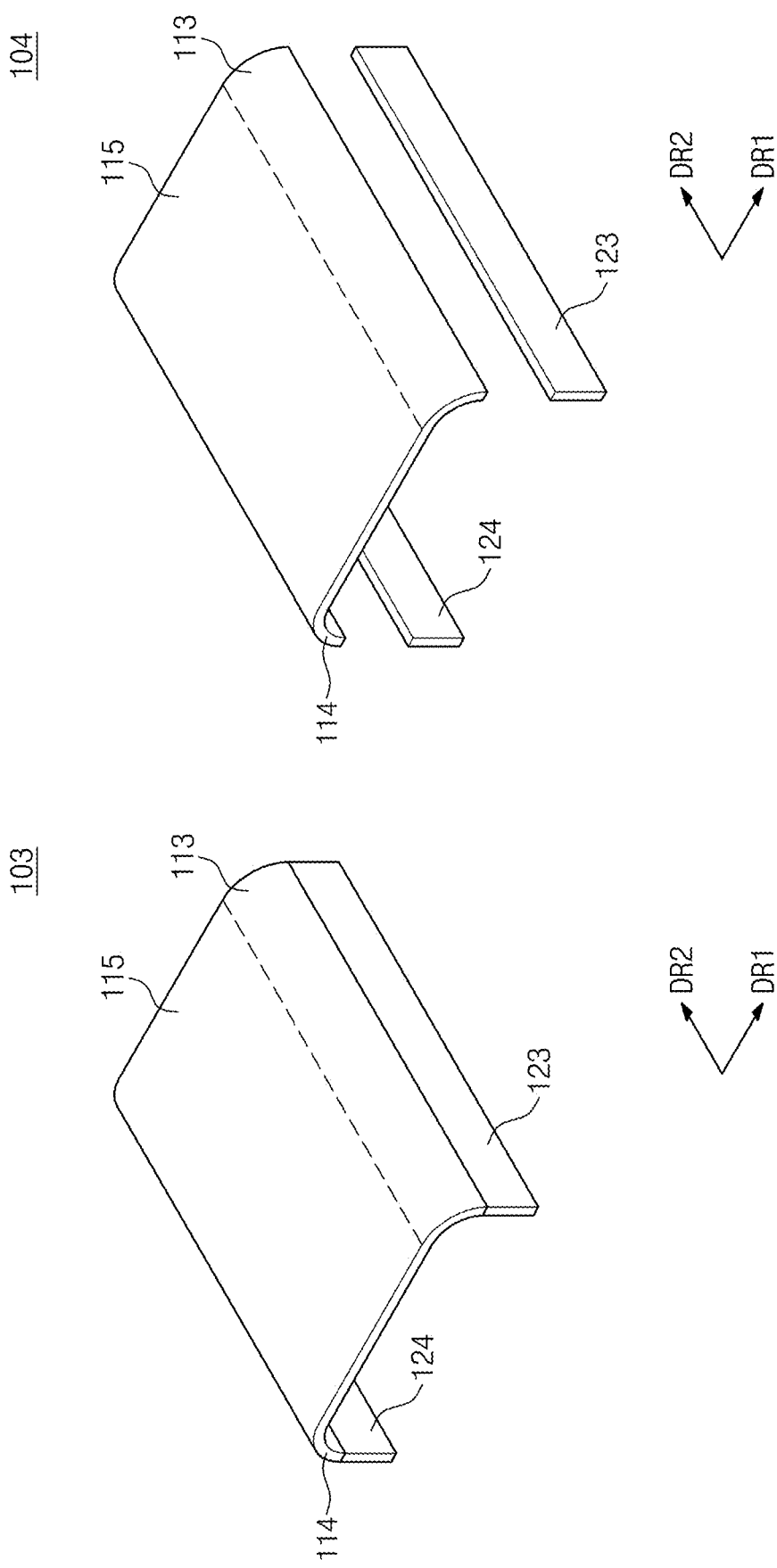

FIGS. 5A-5C are illustrate a forming process according to one embodiment of the inventive concept.

Referring to FIG. 5A, in one embodiment of the inventive concept, a mold part 301 (e.g., a mold) includes first and second bending molds 310a and 310b and a flat mold 313. The first and second bending molds 310a and 310b are spaced from each other in a first direction DR1, and the flat mold 313 may be interposed between the first and second bending molds 310a and 310b in the first direction DR1. The first bending mold 310a may extend in a first direction DR1 from the flat mold 313, and the second bending mold 310b may extend in a fourth direction DR4 (e.g., a direction opposite the first direction DR1) from the flat mold 313.

In one embodiment of the inventive concept, the molding material 103 may be subdivided into (e.g., may include) first and second bent parts 113 and 114 (e.g., first and second bending portions, respectively), which are to be bent through a thermoforming method, and a flat part (e.g., a flat portion), which is formed substantially flat (e.g., which is to remain flat or to not be bent). The flat part, in a plane, includes a middle flat part 115 (e.g., a middle flat portion) interposed between the first and second bent parts 113 and 114, a first flat part 123 (e.g., a first flat portion) extending in the first direction DR1 from the first bent part 113, and a second flat part 124 (e.g., a second flat portion) extending in the fourth direction DR4 from the second bent part 114.

In a first state, support parts 400 (e.g., supports or supporters) support respective second ends 123e and 124e of the first and second flat parts 123 and 124. The support parts 400 are respectively disposed under the second ends 123e and 124e. For example, the support parts 400 respectively overlap the second ends 123e and 124e in the third direction DR3.

In one embodiment of the inventive concept, the support parts 400 may support the second ends 123e and 124e through weights 500. For example, upper surfaces of the support parts 400 contact lower surfaces of the weights 500 and support the lower surfaces of the weights 500 to support the second ends 123e and 124e.

Referring to FIG. 5B, temperature control units 600 (e.g., temperature controllers) may be respectively disposed at or under the first and second bent parts 113 and 114 and extend in the second direction DR2 along the first and second bent parts 113 and 114. The temperature control units 600 may heat the first and second bent parts 113 and 114 up to the fluidization temperature or higher. At the fluidization temperature or higher, the molding material 103 may be fluidized.

In a second state, the support parts 400 move in a direction opposite to (e.g., move away from) the mold part 301. Accordingly, the support parts 400 do not overlap the second ends 123e and 124e in the third direction DR3 such that the support parts 400 do not support the second ends 123e and 124e. As the support parts 400 move to the second state, as further described below, the second ends 123e and 124e may begin to rotate.

As the first and second bent parts 113 and 114 are fluidized, the first and second bent parts 113 and 114 may bend due to the weight of the first and second flat parts 123 and 124. For example, because the first and second bent parts 113 and 114 are fluidized to be flexible while the first and second flat parts 123 and 124 retain their rigidity, the first and second flat parts 123 and 124 are respectively rotated clockwise and counterclockwise due to the gravitational force applied to the first and second flat parts 123 and 124. Accordingly, the first and second bent parts 113 and 114 are bent (e.g., ends of the middle flat part 115 bend to form the first and second bent parts 113 and 114).

For example, the second ends 123e and 124e may respectively rotate about the bending mold 310 clockwise and counterclockwise.

As the first and second bent parts 113 and 114 bend, upper surfaces 311a and 311b of the first and second bending molds 310a and 310b respectively support lower surfaces of the first and second bent parts 113 and 114. Accordingly, when the first and second flat parts 123 and 124 have finished rotating, the first and second bent parts 113 and 114 may be bent to be upwardly convex corresponding to the upper surfaces 311a and 311b of the first and second bending mold 310a and 310b.

Then, the temperature control units 600 cool the first and second bent parts 113 and 114 down to the fluidization temperature or lower.

Then, as illustrated in FIG. 5C, in one embodiment of the inventive concept, the molding material 103, which has been bent as described above, may be removed from the thermoforming apparatus 1000 and the first and second flat parts 123 and 124 may be cut (e.g., the first and second flat parts 123 and 124 may be removed or cut from the molding 103). A molding 104 may be formed by removing (e.g., by cutting) all or part of the first and second flat parts 123 and 124 from the first and second bent parts 113 and 114, respectively.

Figure 6:
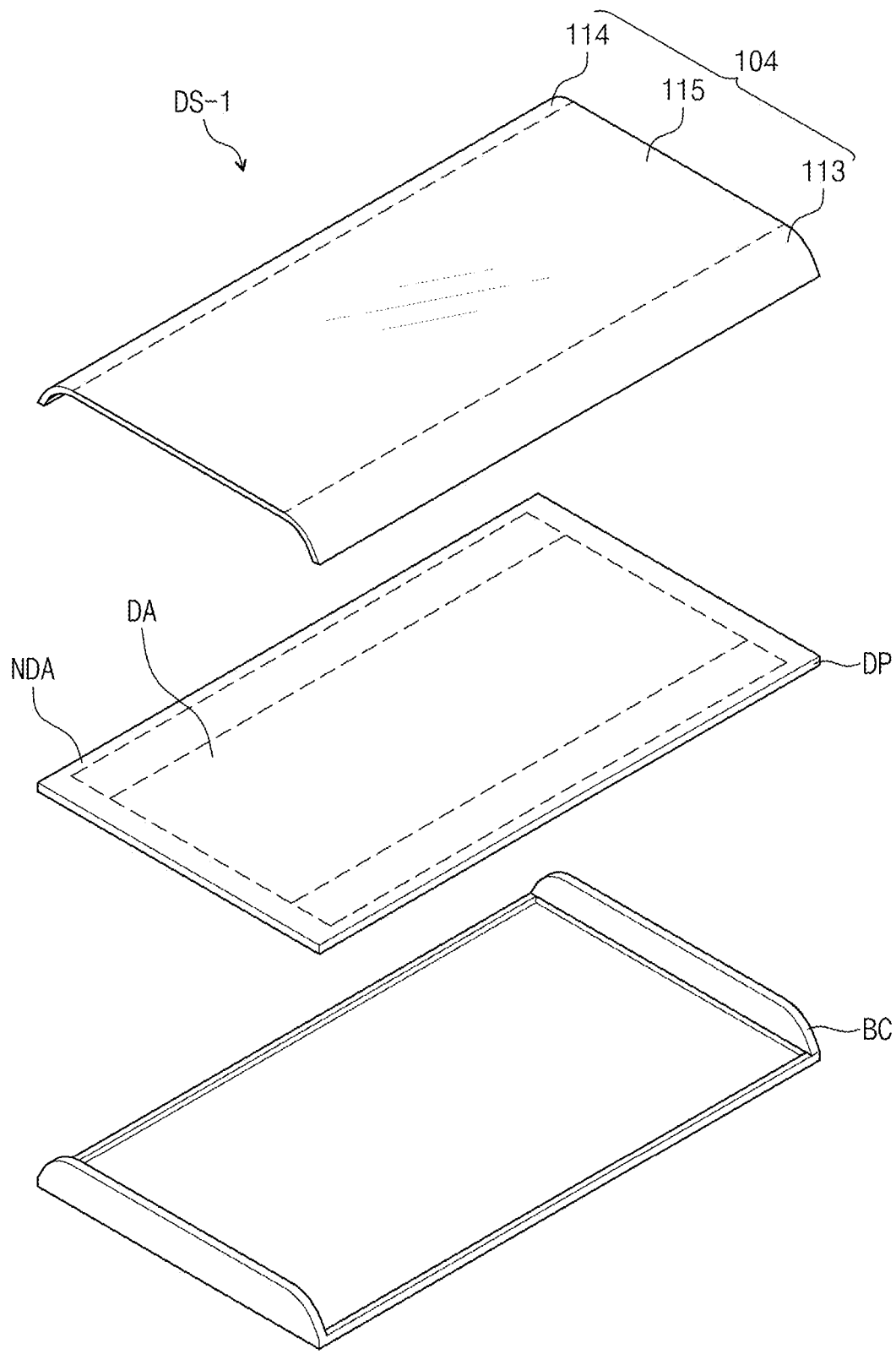
FIG. 6 is an exploded perspective view of a display apparatus to which the molding illustrated in FIG. 5C is applied.

FIG. 6 is an exploded perspective view of a display apparatus to which the molding illustrated in FIG. 5C is applied.

As illustrated in FIG. 6, a molding 104 may be applied to (e.g., included in) a display apparatus DS-1 as a cover member 104. Because the display apparatus DS-1 is substantially similar to or the same as the display apparatus illustrated in FIG. 4, overlapping descriptions thereof may not be provided.

According to the above-mentioned description, the bent part may be bent or formed by the weight of the flat part and may be bent to have a shape corresponding to the upper surface of the bending mold. Thus, the bent shape of the bent part may be effectively formed without defect, the process time for such forming processes may be reduced, and the process costs may be reduced. Also, a bent part having a relatively large area may be effectively formed.

While exemplary embodiments are described above, a person skilled in the art would understand that many modifications and variations may be made to the described embodiments without departing from the spirit and scope of the present invention as defined in the following claims and their equivalents.

What is claimed is:

1. An apparatus for thermoforming a molding material to have a bent portion and a flat portion extending from bent portion, the apparatus comprising:
    a base stage comprising a sliding surface;
    a bending mold on the base stage, and having a curved upper surface;
    a temperature controller configured to heat the molding material such that the bent portion is fluidized;
    a weight coupled to the flat portion; and
    a magnet beneath the sliding surface and arranged along a rotation path of the flat portion,
    wherein the fluidized bent portion is configured to be bent due to the weight,
    wherein when the bent portion bends, the weight slides along the sliding surface, and
    wherein the weight comprises a magnetic material, and the magnet is configured to apply a force to the weight in a direction away from a center of the bent portion.

2. The apparatus of claim 1, wherein the flat portion has a first end extending from the bent portion and a second end opposite to the first end, and
    wherein when the bent portion bends, the second end rotates about the bending mold.

3. The apparatus of claim 2, further comprising a support member,
    wherein, in a first state, the support member is under the flat portion in a vertical direction such that the flat portion is supported, and
    wherein, in a second state, the support member does not overlap the second end in the vertical direction such that the flat portion rotates.

4. The apparatus of claim 1, wherein the temperature controller is configured to cool the bent portion to a fluidization temperature of the bent portion or lower.

5. The apparatus of claim 1, wherein the bending mold is non-overlapping with the flat portion when viewed in a plane.

* * * * *